United States Patent
Li

(10) Patent No.: US 9,429,766 B2
(45) Date of Patent: Aug. 30, 2016

(54) THREE-DIMENSIONAL DISPLAY METHOD AND THREE-DIMENSIONAL DISPLAY DEVICE

(71) Applicant: SUPERD CO. LTD, Shenzhen, Guangdong (CN)

(72) Inventor: Dongfang Li, Guangdong (CN)

(73) Assignee: SuperD CO. LTD, Shenzhen, Guangdong (CN)

( * ) Notice: Subject to any disclaimer, the term of this patent is extended or adjusted under 35 U.S.C. 154(b) by 209 days.

(21) Appl. No.: 14/499,185

(22) Filed: Sep. 28, 2014

(65) Prior Publication Data

US 2015/0195513 A1 Jul. 9, 2015

(30) Foreign Application Priority Data

Jan. 8, 2014 (CN) .......................... 2014 1 0008851

(51) Int. Cl.
*H04N 13/04* (2006.01)
*H04N 13/00* (2006.01)
*G02B 27/26* (2006.01)
*G02B 27/22* (2006.01)

(52) U.S. Cl.
CPC ........... *G02B 27/26* (2013.01); *G02B 27/2214* (2013.01); *G02B 27/2264* (2013.01); *H04N 13/0497* (2013.01); *H04N 13/0409* (2013.01)

(58) Field of Classification Search
CPC ..................... H04N 13/0425; H04N 13/0413; G02B 27/2214; G02B 27/26
USPC ............ 348/55, 42, 43, 47, 48, 51; 386/223, 386/200, 210
See application file for complete search history.

(56) References Cited

FOREIGN PATENT DOCUMENTS

CN 102685369 * 9/2012

* cited by examiner

*Primary Examiner* — Robert Chevalier
(74) *Attorney, Agent, or Firm* — Andrew C. Cheng

(57) ABSTRACT

The present invention provides a 3D display method, which comprises: obtaining an interference value of a display unit displaying at least one pair of images with parallax; adjusting the display unit based on the interference value; and the adjusted display unit displaying the at least one pair of images with parallax. The present invention also provides a 3D display device. Through the technical solution of the present invention, the crosstalk phenomenon during the 3D display process can be relieved to optimize the 3D display result.

20 Claims, 4 Drawing Sheets

THREE-DIMENSIONAL DISPLAY METHOD AND THREE-DIMENSIONAL DISPLAY DEVICE

BACKGROUND OF THE INVENTION

1. Field of the Invention

The present invention relates to the field of three-dimensional (3D) displaying techniques, and in particular to a three-dimensional display method and three-dimensional display device.

2. The Related Arts

In the process of the three-dimensional (3D) displaying, the display needs to provide the left-eye and right-eye images to the left eye and right eye of a viewer, respectively. Due to several reasons, the left eye of the viewer may see a certain amount of the contents of the right-eye image and the right eye of the viewer may see a certain amount of the contents of the left-eye image, which leads to a phenomenon called crosstalk (or ghost) in 3D scenes, which greatly influences the quality of the 3D display.

Therefore, the process of how to reduce the presence of 3D display crosstalk becomes an important technical problem to be addressed.

SUMMARY OF THE INVENTION

The present invention is to address the aforementioned issues in the known techniques. To solve the aforementioned problems in known technique, an object of the present invention is to provide a 3D display method.

Another object of the present invention is to provide a 3D display device.

To achieve the above objects, the present invention provides a 3D display method, which includes: obtaining an interference value of a display unit displaying at least one pair of images with parallax; adjusting the display unit based on the interference value; and the adjusted display unit displaying the at least one pair of images with parallax.

In the instant technical solution, when displaying at least one pair of images with parallax in a 3D manner, the crosstalk resulted from different display values can be reduced by adjusting the interference value so that the optimized display values for the display unit can be obtained so as to overcome the poor displaying result caused by the crosstalk and improve the overall 3D viewing experience.

In addition, according to a preferred embodiment of the present invention, the 3D display method further includes technical feature as follows.

According to a preferred embodiment of the present invention, the step of obtaining the interference value includes: obtaining display values of locations corresponding to the at least one pair of images with parallax; based on correspondence between the display values and pre-stored display values and weights, identifying respective weights corresponding to the at least one pair of images with parallax; and based on the respective weights corresponding to the at least one pair of images with parallax, and the difference between the optimized display values and the display values of the location corresponding to the at least one pair of images with parallax respectively, identifying the interference value.

In the instant technical solution, certain rules exist in the extent of crosstalk experienced by human eyes when the crosstalk is caused by different display values. By storing the rules in the 3D display device, the display values of the locations corresponding to the at least one pair of images with parallax can be based to identify the weights corresponding to the images so as to adjust the display values of the display unit according to the control of interference value to relieve crosstalk.

Because the crosstalk is mutually generated between at least one pair of images with parallax, the obtaining of display values of locations corresponding to at least one pair of images with parallax enables the understanding of the affected extent on the left-eye image and right-eye image. When the optimized display values is adjusted based on the crosstalk effect, the left-eye image and the right-eye image can both be considered to avoid inconsistent adjustment of the left-eye image and right-eye image, which may result in an inconsistent viewing for both eyes.

Specifically, the correspondence between the display values and weights can be stored in various forms, such as, tables, curves, and so on. The display values can be used to identify the corresponding weights to calculate the final optimized display values.

According to a preferred embodiment of the present invention, the step of obtaining the interference value specifically includes: if a spectroscopic device is disposed in the 3D display device to which the display unit belongs, based on the display area ratio corresponding to the at least one pair of images with parallax on the display unit, adjusting weights corresponding to the at least one pair of images with parallax.

In the instant technical solution, since the display area ratio is related to the affected extent, for example, a higher affected extent for a larger display area ratio, therefore, by considering both the display area ratio and the human eye experience rule, the adjustment to the optimized display values can be more precisely realized. In other words, the interference value on the left-eye image and the right-eye image is reduced to decrease the crosstalk effect.

According to a preferred embodiment of the present invention, the step of adjusting the display unit based on the interference value includes: based on the weights respectively corresponding to the at least one pair of images with parallax and the display values of locations corresponding to the at least one pair of images with parallax, generating a calculation equation for the interference value with respect to the optimized display values; when the calculation equation has a minimum interference value and the optimized display value of the display unit is between the display value of the left-eye image and the display value of the right-eye image, the optimized display value of the display unit being obtained; wherein the weights respectively corresponding to the at least one pair of images with parallax are: for at least one pair of images with parallax, a first weight of a first crosstalk amount in the left-eye image caused by the right-eye image on the left-eye image, and a second weight of a second crosstalk amount in the right-eye image caused by the left-eye image on the right-eye image.

In the instant technical solution, through finding the weights corresponding to the display values and generating the calculation equation for the interference value accordingly, the affected extent on the left-eye image and the right-eye image is embodied. Therefore, when the optimized display value is calculated based on the equation, the adjustment on the crosstalk amount on the left-eye image and the right-eye image can be reflected, i.e., reducing crosstalk effect.

According to a preferred embodiment of the present invention, the method further includes: based on the difference between the first crosstalk amount and the second crosstalk amount, adjusting the calculational equation of the interference value to balance the first crosstalk amount and the second crosstalk amount; and based on the adjusted calculation equation of the interference value, obtaining the optimized display value of the display unit.

In the instant technical solution, not only the interference value must be minimized, the difference between the first crosstalk amount and the second crosstalk amount is also considered through the adjustment on the calculation equation of the interference value so that the respective crosstalk amount corresponding to the left-eye image and the right-eye image is more balanced and reasonable when the left-eye image and the right-eye image are displayed with the adjusted display values, which makes the left-eye image and the right-eye image more coordinated to improve viewing experience.

Preferably, the step of adjusting interference value includes: adding a balance control parameter for the difference between the first crosstalk amount and the second crosstalk amount to the calculation equation of the interference value.

In the instant technical solution, through adding the balance control parameter, the consideration of the difference between the first crosstalk amount and the second crosstalk amount is taken into account so as to balance the respective crosstalk amount corresponding to the left-eye image and right-eye image, which makes the left-eye image and the right-eye image more coordinated to improve viewing experience.

According to a preferred embodiment of the present invention, the correspondence includes: for at least one pair of images with parallax, when the display value of an image is larger than the display value of the other image, the weight corresponding to the image is larger than the weight corresponding to the other image.

According to a preferred embodiment of the present invention, the correspondence includes: when the difference between the display values of the at least one pair of images with parallax is the same, if the display value of an image is larger than the display value of the other image, the weight corresponding to the image is positively proportional to the display value of the image; and the weight corresponding to the other image is negatively proportional to the display value of the other image.

According to a preferred embodiment of the present invention, the correspondence includes: when the sum of the display values of the at least one pair of images with parallax is the same, if the display value of an image is larger than the display value of the other image, the weight corresponding to the image is negatively proportional to the display value of the image; and the weight corresponding to the other image is positively proportional to the display value of the other image.

Another embodiment of the present invention provides a 3D display device, which includes: an obtaining unit, for obtaining an interference value of a display unit displaying at least one pair of images with parallax; and an adjustment unit, for adjusting the display unit based on the interference value; and the adjusted display unit displaying the at least one pair of images with parallax.

In the instant technical solution, when displaying at least one pair of images with parallax in a 3D manner, the crosstalk resulted from different display values can be reduced by adjusting the interference value so that the optimized display values for the display unit can be obtained so as to overcome the poor displaying result caused by the crosstalk and improve the overall 3D viewing experience.

In addition, according to a preferred embodiment of the present invention, the 3D display device further includes technical feature as follows.

According to a preferred embodiment of the present invention, the obtaining unit further includes: a display value obtaining sub-unit, for obtaining display values of locations corresponding to the at least one pair of images with parallax; a weight identifying sub-unit, for based on correspondence between the display values and pre-stored display values and weights, identifying respective weights corresponding to the at least one pair of images with parallax; and an interference value identifying sub-unit, for based on the respective weights corresponding to the at least one pair of images with parallax, and the difference between the optimized display values and the display values of the location corresponding to the at least one pair of images with parallax respectively, identifying the interference value.

In the instant technical solution, certain rules exist in the extent of crosstalk experienced by human eyes when the crosstalk is caused by different display values. By storing the rules in the 3D display device, the display values of the locations corresponding to the at least one pair of images with parallax can be based to identify the weights corresponding to the images so as to adjust the display values of the display unit according to the control of interference value to relieve crosstalk.

Because the crosstalk is mutually generated between at least one pair of images with parallax, the obtaining of display values of locations corresponding to at least one pair of images with parallax enables the understanding of the affected extent on the left-eye image and right-eye image. When the adjustment to the optimized display values is based on the crosstalk effect, the left-eye image and the right-eye image can both be considered when adjusted to avoid adjusting the left-eye image and right-eye image inconsistently, which may result in an inconsistent viewing for both eyes.

Specifically, the correspondence between the display values and weights can be stored in various forms, such as, tables, curves, and so on. The display values can be used to identify the corresponding weights to calculate the final optimized display values.

According to a preferred embodiment of the present invention, the obtaining unit further includes: a weight adjustment sub-unit, if a spectroscopic device is disposed in the 3D display device to which the display unit belongs, for based on the display area ratio corresponding to the at least one pair of images with parallax on the display unit, adjusting weights corresponding to the at least one pair of images with parallax.

In the instant technical solution, since the display area ratio is related to the affected extent, such as, a higher affected extent for a larger display area ratio, therefore, by considering both the display area ratio and the human eye experience rule, the adjustment to the optimized display values can be more précised realized. In other words, the interference value on the left-eye image and the right-eye image is reduced to decrease the crosstalk effect.

According to a preferred embodiment of the present invention, the adjustment unit further includes: a calculation equation generating sub-unit, for based on the weights respectively corresponding to the at least one pair of images with parallax and the display values of locations corresponding to the at least one pair of images with parallax, generating a calculation equation for the interference value with respect to the optimized display values; a value identifying sub-unit, when the calculation equation has a minimum interference value and the optimized display value of the display unit is between the display value of the left-eye image and the display value of the right-eye image, for obtaining the optimized value of the display unit; wherein the weights respectively corresponding to the at least one pair of images with parallax are: for at least one pair of images with parallax, a first weight of a first crosstalk amount in the left-eye image caused by the right-eye image on the left-eye image, and a second weight of a second crosstalk amount in the right-eye image caused by the left-eye image on the right-eye image.

In the instant technical solution, through finding the weights corresponding to the display values and generating the calculation equation for the interference value accordingly, the affected extent on the left-eye image and the right-eye image is embodied. Therefore, when the optimized display value is calculated based on the equation, the adjustment on the crosstalk amount on the left-eye image and the right-eye image can be reflected, i.e., reducing crosstalk effect.

According to a preferred embodiment of the present invention, the device further includes: a balancing unit, for based on the difference between the first crosstalk amount and the second crosstalk amount, adjusting the calculational equation of the interference value to balance the first crosstalk amount and the second crosstalk amount; and based on the adjusted calculation equation of the interference value, the value identifying sub-unit obtains the optimized display value of the display unit.

In the instant technical solution, not only the interference value must be minimized, the difference between the first crosstalk amount and the second crosstalk amount is also considered through the adjustment on the calculation equation of the interference value so that the respective crosstalk amount corresponding to the left-eye image and the right-eye image is more balanced and reasonable when the left-eye image and the right-eye image are displayed with the adjusted display values, which makes the left-eye image and the right-eye image more coordinated to improve viewing experience.

Preferably, the balancing unit further includes: a parameter adding sub-unit, for adding a balance control parameter for the difference between the first crosstalk amount and the second crosstalk amount to the calculation equation of the interference value.

In the instant technical solution, through adding the balance control parameter, the consideration of the difference between the first crosstalk amount and the second crosstalk amount is taken into account so as to balance the respective crosstalk amount corresponding to the left-eye image and right-eye image, which makes the left-eye image and the right-eye image more coordinated to improve viewing experience.

According to a preferred embodiment of the present invention, the correspondence includes: for at least one pair of images with parallax, when the display value of an image is larger than the display value of the other image, the weight corresponding to the image is larger than the weight corresponding to the other image.

According to a preferred embodiment of the present invention, the correspondence includes: when the difference between the display values of the at least one pair of images with parallax is the same, if the display value of an image is larger than the display value of the other image, the weight corresponding to the image is positively proportional to the display value of the image; and the weight corresponding to the other image is negatively proportional to the display value of the other image.

According to a preferred embodiment of the present invention, the correspondence includes: when the sum of the display values of the at least one pair of images with parallax is the same, if the display value of an image is larger than the display value of the other image, the weight corresponding to the image is negatively proportional to the display value of the image; and the weight corresponding to the other image is positively proportional to the display value of the other image.

Through the above technical solutions, the crosstalk effect in the 3D displaying process can be effectively reduced to improve 3D displaying result.

The foregoing will become better understood from a careful reading of a detailed description provided herein below with appropriate reference to the accompanying drawings.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To clearly describe the objects, features and advantages, the following refers drawings and embodiments. It should be noted that, the features in the embodiments can be mutually combined when not conflicting.

The following describes details for thorough understanding of the present invention. However, the present invention may also be embodied in other means not described in the disclosure. Therefore, the scope of the present invention is not restricted by the disclosed embodiments.

A crosstalk is a phenomenon that the left eye of a viewer can sense the information of the right-eye image and the right eye can sense the information of the left-eye image when viewing a 3D displaying. Based on different 3D displaying theories, the reasons causing crosstalk include:

When grating is used for spectroscopic implementation in naked eye 3D displaying, the left-eye and right-eye image information will be transmitted to the eyes simultaneously through the grating of the display device. Due to the grating design and the manufacturing error, when a viewer viewing a 3D image, the left eye can see a certain amount of right-eye image and the right eye can see a certain amount of left-eye image, which results in the crosstalk effect in 3D displaying.

In 3D displaying with the viewer wearing glasses, the information of the left-eye and right-eye images passes with rapidly switching temporally through the spectral glasses to reach the eyes. When a slight asynchronous error between the aperture glasses and the switching of the left-eye and right-eye images, or the optical leakage of the glasses causes the incomplete light-splitting, the left eye can see a certain amount of right-eye image and the right eye can see a certain amount of left-eye image, which results in the crosstalk effect in 3D displaying. Or, the information of the left-eye and right-eye images is transmitted horizontal polarized light or vertical polarized light to reach the eyes, and then a pair of glasses with polarized light of different direction to split the light. However, because the filtering effect of the glasses is limited so that the left eye can see a certain amount of right-eye image and the right eye can see a certain amount of left-eye image, which results in the crosstalk effect in 3D displaying.

Figure 1:
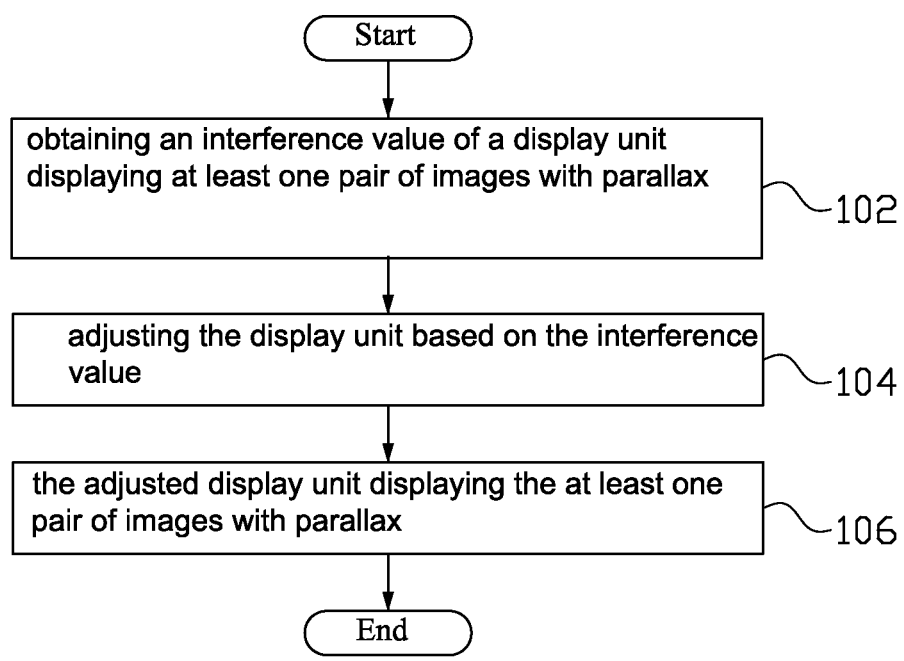
FIG. 1 is a flowchart showing a 3D display method according to an embodiment of the present invention.

FIG. 1 is a flowchart showing a 3D display method according to an embodiment of the present invention.

As shown in FIG. 1, the present invention provides a 3D display method, which comprises:

Step 102: obtaining at least one pair of an interference value of a display unit displaying at least one pair of images with parallax;

Step 104: adjusting the display unit based on the interference values; and

Step 106: the adjusted display unit displaying the at least one pair of images with parallax.

In the instant technical solution, when displaying at least one pair of images with parallax in a 3D manner, the crosstalk resulted from different display values can be reduced by adjusting the interference value so that the optimized display values for the display unit can be obtained so as to overcome the poor displaying result caused by the crosstalk and improve the overall 3D viewing experience.

In addition, according to a preferred embodiment of the present invention, the 3D display method further comprises the following technical feature:

According to a preferred embodiment of the present invention, the step of obtaining the interference value comprises: obtaining display values of locations corresponding to the at least one pair of images with parallax; based on correspondence between the display values and pre-stored display values and weights, identifying respective weights corresponding to the at least one pair of images with parallax; and based on the respective weights corresponding to the at least one pair of images with parallax, and the difference between the optimized display values and the display values of the location corresponding to the at least one pair of images with parallax respectively, identifying the interference value.

In the instant technical solution, certain rules exist in the extent of crosstalk experienced by human eyes when the crosstalk is caused by different display values. By storing the rules in the 3D display device, the display values of the locations corresponding to the at least one pair of images with parallax can be based to identify the weights corresponding to the images so as to adjust the display values of the display unit according to the control of interference value to relieve crosstalk.

Because the crosstalk is mutually generated between the left-eye and right-eye images, obtaining display values of locations corresponding to the left-eye and right-eye images enables the understanding of the affected extent on the left-eye image and right-eye image. When the adjustment to the optimized display values is based on the crosstalk effect, the left-eye image and the right-eye image can both be considered when adjusted so as to avoid adjusting the left-eye image and right-eye image inconsistently, which may result in an inconsistent viewing for both eyes.

Specifically, the correspondence between the display values and weights can be stored in various forms, such as, tables, curves, and so on. The display values of the display units can be used to identify the corresponding weights to calculate the final optimized display values. The present embodiment does not impose any specific restriction.

Also, in the sentence of the display values of locations corresponding to the at least one pair of images with parallax, the corresponding locations specifically refer to the displaying locations on the display device corresponding to images. For convenience of description, the left-eye image and the right-eye image can be resized to the resolution of the display device. Selecting a display unit on the display device, the information value of the left-eye image corresponding to the location on the display unit is L, and the information value of the right-eye image is R, i.e., the display value.

Figure 2:
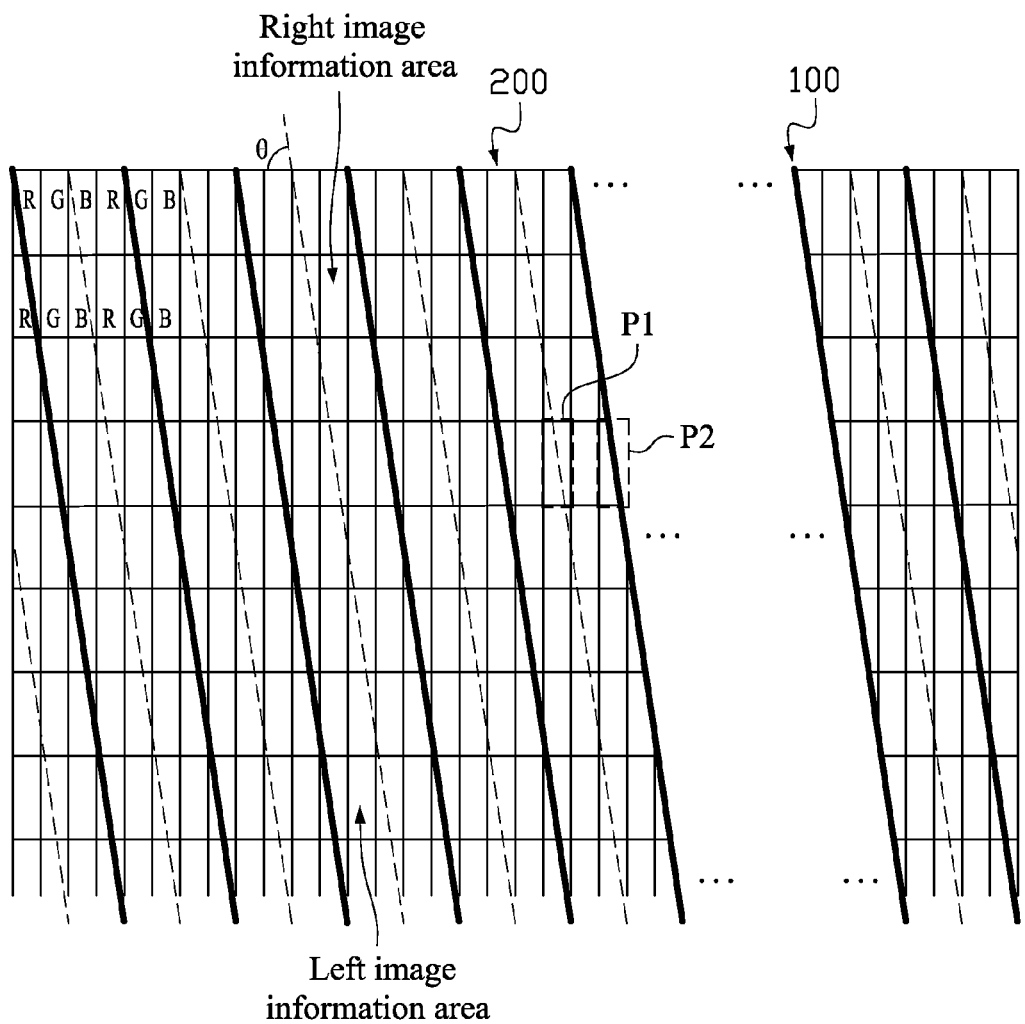
FIG. 2 is a schematic view showing the formation of crosstalk in 3D display device.

FIG. 2 is a schematic view showing the formation of crosstalk in 3D display device.

As shown in FIG. 2, a slit grating is used as spectroscopic device 100, and the slit grating is projected onto a display panel (i.e., the display device 200) according to the viewing of human eye. The broad line has a horizontal width w, which is the horizontal light-blocking width. The horizontal gap between the centers of two adjacent broad lines is the pitch (arrangement period) of the display panel, and $\delta=(1-w)/pitch$ is the light-transmittance ratio or the aperture ratio of the slit grating. Let the tilt angle between the slit grating and the display panel be $\theta$, and some display units, such as pixels P1 and P2, a part in the left image information area (the display panel area seen by the left eye through the grating) and a part in the right image information area (the display panel area seen by the right eye through the grating) will appear on the display panel, as well as a part blocked by the slit grating and appearing in neither left nor right image information area.

It should be noted that although the spectroscopic device 100 in FIG. 2 is a slit grating, the technical solution of the present invention is also applicable to lens grating. For a specific embodiment, the optical model corresponding to the lens grating can be simplified equivalently to the condition where the slit grating has an aperture ratio of $\delta=100\%$. That is, there exists no problem of shielding for pixels P1, P2, and the sum of the area ratio seen by left eye and right eye is 100%.

For a more specific embodiment, the display area/display area ratio of the left-eye image and the right-eye image on the display unit can be considered as a weighted result (i.e., the contribution of each location of the display units P1, P2 to the crosstalk is weighted). Specifically, when a line connecting a location on the display unit P1/P2 and the viewer's eye is closer to the center of the lens of the lens grating, the weight of the crosstalk for the location is considered less. On the other hand, when a line connecting a location on the display unit P1/P2 and the viewer's eye is closer to the border of two lenses, the weight of the crosstalk for the location is considered more.

In actual application, the display units P1 and P2 as an entity can ultimately only display a fixed color or brightness. Therefore, no matter how P1 and P2 display, as long as there exists difference of the left and right image information in the display unit, the crosstalk will occur, i.e., the inherent crosstalk of display device.

The display unit refers to a display structure unit as an entity. For example, in an RGB-based display panel, with considering brightness without the color difference, a subpixel can be a sub-pixel unit, which is an independent display unit able to display a brightness value. When the color difference is also considered, such as, a red sub-pixel being divided, a color shift will occur if the green component and the blue component of the main pixel where the pixel exists do not change. Therefore, it is necessary to treat the main pixel as an entity, i.e., a display unit entity. The value of the entity can be considered as the grayscale converted from RGB, indicating the entity brightness. There is also RGBW-based display panel. Specifically, display units P1, P2 can be any unit area on the display device 200 of FIG. 2, such as, some pixel set, main pixel or sub-pixel (the layout direction of the pixel can be lateral or vertical). For simplicity of description, the following uses sub-pixel as an example.

In the mean time, the display value of the left-eye mage, right-eye image and any display unit can be any parameter value able to show different effect, such as pixel values, brightness values, and grayscale values. For description, the present invention uses display value to indicate specific parameter types and combines the RGB color space for explanation.

Figure 3:
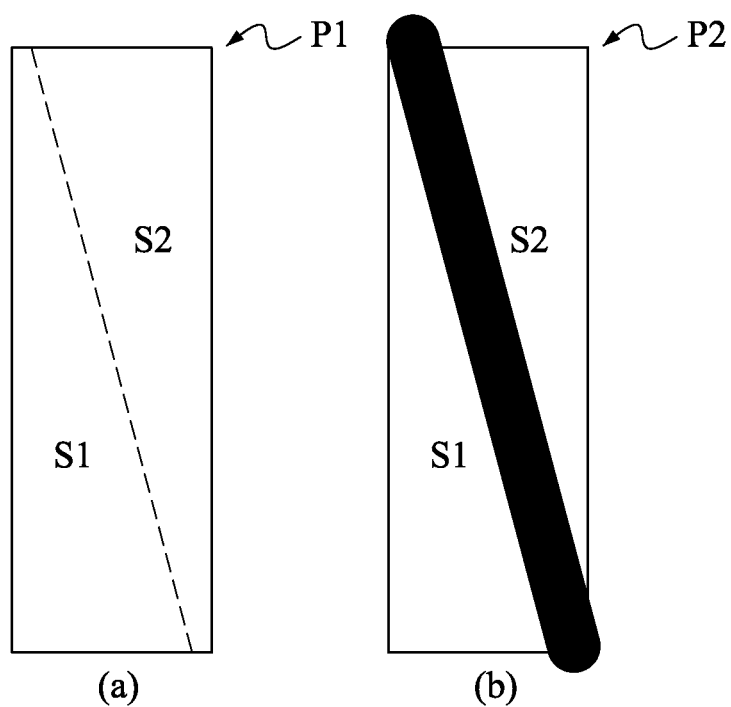
FIG. 3 is a schematic view showing a display unit according to an embodiment of the present invention.

FIG. 3 is a schematic view showing a display unit according to an embodiment of the present invention.

As shown in FIG. 3, both the display units P1, P2 of FIGS. 3(*a*), 3(*b*) have a part in the left image information area (corresponding to left-eye image), a part in the right image information area (corresponding to right-eye image), and possible a part blocked by the slit grating, shown as the shielding on the display unit caused by the black slant lines in FIG. 3(*b*), which is neither in left image information nor in right image information. In actual application, pixel P1 or P2 of the display device can display only a fixed pixel value as an entity. As long as the pixel value is inconsistent with the left-eye image or the right-eye image, the crosstalk occurs, and a minimization problem exists. That is, the final display value of P1 or P2 must be set so as to minimize the crosstalk experienced in viewing.

The information ratio of the display units P1, P2 seen by the left and right eye of the viewer is S1:S2, wherein S1+S2=1, and 0≤S1≤1, 0≤S2≤1. In the glasses-based 3D technology, S1, S2 can be considered as the light-splitting purity parameter of the spectral glasses. For example, when the glasses has a leakage rate of 5%, the information ratio of each display unit of the left-eye image seen by the left eye is S1=95% and seen by the right eye S2=5%. Also, in grating-based naked eye 3D technology, S1, S2 can be considered as the area ratio of the display unit seen by the left eye and right eye through the grating.

For convenience of description, the following uses naked eye 3D displaying process as example to describe the technical solution of the present invention.

Embodiment 1

Tilt Lens Grating

Model Construction:
1. Initial Model:

In the present embodiment, a tilt lens grating is used. The 3D display technical solution of the present embodiment using tilt lens grating can use viewer location to perform tracking displaying mode, or fixed location displaying mode. No specific restriction is imposed by the present invention. Based on the above description, the lens grating can be equated to or simplified as a slit grating model with aperture ratio δ=100%. Display units P1, P2 can be sub-pixel, and the image display value (information value) can use RGB mode. The display value of the left-eye image is L and the display value of the right-eye image is R, wherein: 0≤L,R≤1. The RGB orientation of the 3D display device is horizontal, and the handheld terminal device, such as smart phone, can also be RGB vertical orientation.

In the instant technical solution of the present invention, the total amount of crosstalk must be controlled, that is, the interference value A. For example, the crosstalk caused by the right-eye image on the left-eye image is defined as the left-eye crosstalk total amount; and the crosstalk caused by the left-eye image on the right-eye image is defined as the right-eye crosstalk total amount. Therefore, the following minimization computation model is obtained:

$$A = \text{left-eye crosstalk total amount} + \text{right-eye crosstalk total amount} \quad (1)$$

For a preferred embodiment, a control module can be added to equation (1), so that the equation (1) is transformed into:

$$A = \text{left-eye crosstalk total amount} + \text{right-eye crosstalk total amount} + \text{control module} \quad (1')$$

Wherein the control module is for performing balancing during the crosstalk adjustment process, and the balancing can be in several aspects.

For example, to prevent the final result from causing a large crosstalk difference between the left and right eyes and becoming asymmetric, a control module can be added to balance the final crosstalk amount for the left and right eyes.

For another example, when a viewer is located on one side of the display device, such as, to the right or left of the center of the display device, an angle exists between the ray emitted by each display unit passing through the lens grating or the slit grating into the left eye and the right eye. The angle will affect the lens grating or the slit grating during the process so that the crosstalk amount received by the left eye and the right eye will be amplified differently. For example, for viewers on the left, the left eye is more slanted and more crosstalk; and for the viewers on the right, the right eye is more slanted and more crosstalk. The control module can adjust the crosstalk imbalance based on the spatial location of the left eye and right eye of the viewer.

For yet another example, the control module can balance the crosstalk imbalance caused by tracking errors. When a viewer is on the left or right side, the tracking error will be greater than when a viewer is at the center. For example, the error is higher for the larger deviation from the center. The control module can be used to adjust the error.

For convenience of description, the following refers to the model of equation (1).

2. Parameter Definition:

For convenience of description, the left-eye image and the right-eye image can be resized to the resolution of the display device. Select a display unit on the display device, such as a sub-pixel. Assume that the display value (or information value) of the left-eye image is L, the display value of the right-eye image is R, and the final actual display value of the display unit is P (for glasses-based 3D technology, the actual display value P has two values). The crosstalk amount can be defined as the absolute value of the difference between P and L to the power of n and the absolute value of the difference between P and R to the power of n (n is a positive real number). It should be noted that other definition can also be used, such as, absolute value of the difference of the square. No specific restriction is imposed here. The parameter α is used to depict the control factor on the crosstalk amount of the left eye caused by the display device (the display device 200 in FIG. 2) and spectroscopic device (the spectroscopic device 100 in FIG. 2), and the parameter β is used to depict the control factor on the crosstalk amount of the right eye caused by the display device and spectroscopic device. The parameters α and β are used to correspond to the weight of the left-eye crosstalk total amount and the right-eye crosstalk total amount in the final crosstalk total amount A. Based on the above definition, the above crosstalk total amount equation (1) can be:

$$A = \alpha |P-L|^n + \beta |P-R|^n + \geq 0 \quad (2)$$

As such, to eliminate or minimize the crosstalk, the most reasonable P must be found so that the equation (2) can result in a minimum crosstalk total amount A entering the left eye and the right eye.

Solution of the Model

For the convenience of description, the following uses L≤R as example to explain the human eye visual experience rule.

(1) Bright Crosstalk and Dark Crosstalk

When L and R have different display values, for human eyes, the crosstalk on R caused by L (i.e., the left-eye image on the right-eye image) is different from the crosstalk on L caused by R (i.e., the right-eye image on the left-eye image.

Assume that the display unit P1 (shown in FIG. 2) has a display value P=L, there exists no crosstalk for the left-eye image. However, because P≥L, the actual display value is higher than the ideal display value for the left-eye image, which is called bright crosstalk.

On the other hand, if the display unit P1 has a display value P=R, there exists no crosstalk for the right-eye image. However, because P≤L, the actual display value is lower than the ideal display value for the right-eye image, which is called dark crosstalk.

When the difference extent is the same, i.e., P−L=R−P, the bright crosstalk and the dark crosstalk make very different viewing experience for the viewer. The human eye is more sensitive to the bright crosstalk. For brightness, the human eye is more sensitive to a pixel with higher brightness on a white image than a pixel with lower brightness on a white image.

Specifically, take RGB color space as example. Assume that the display shows an image of RGB=(200, 200, 200). When point A has a corresponding $RGB_{(A)}$=(150, 150, 150), point B has a corresponding $RGB_{(B)}$=(250, 250, 250), and both A and B are located at the positions with similar prominence, the human eye is more easily to detect point B, i.e., more sensitive to bright crosstalk.

Therefore, when L<R, the crosstalk to the left-eye image is the bright crosstalk, and a higher value should be selected for weight factor α corresponding to the left-eye image than the value of β, as a penalty for the fact that a bright crosstalk is more sensitive to the human eye; while the crosstalk to the right-eye image is the dark crosstalk, and a higher value should be selected for weight factor β corresponding to the right-eye image than the value of α, as a reward for the fact that a dark crosstalk is less sensitive to the human eye.

If Tol1 depicts the tolerance coefficient of the left eye regarding the bright crosstalk or dark crosstalk, and Tol2 depicts the tolerance coefficient of the right eye regarding the bright crosstalk or dark crosstalk, to correspond to the value selection rule for α and β, the value selected for Tol1 should be relatively bigger than the value selected for Tol2.

(2) Changes in Experience when Difference between Display Values is the Same

Assume that the display area ratios S1 and S2 in the embodiment of FIG. 2 are the same, and further assume that the brightness values (using brightness as example, and other display values may also be used) of the left-eye and right-eye images at P1 are respectively L1=0 and R1=20, and the brightness values of the left-eye and right-eye images at P2 are L2=200 and R2=220. At this situation, R1−L1=R2−L2=20, that is, the difference between the display values of the pair of images with parallax at P1 is equal to the difference between the display values of the pair of images with parallax at P2. According to the above display area ratios (specifically, because S1=S2, the brightness value can be the average of the brightness values of the left-eye and right-eye images): the brightness value at P1 is p1=10, and the brightness value at P2 is p2=210.

Based on actual experience, the left eye experiences the bright crosstalk and the crosstalk extent at P1 is higher than that at P2; therefore, the tolerance coefficient Tol1 for the left eye should have a higher value at P1 than P2 as a penalty for the bright surrounding at P1.

In fact, the final display brightness value at P1 is the infinite times of the brightness value L1 of the left-eye image, and the final display brightness value at P2 is roughly the same as the brightness value L2 of the left-eye image (without obvious difference) so that the bright crosstalk at P1 is more sensitive to the bright crosstalk at P2. The rule for the left eye experience can be summarized as follows.

When the difference between brightness R−L for the left-eye and right-eye images is fixed, the bright crosstalk experienced by left eye is monotonically related to the values of the left-eye and right-eye images in the entire brightness range. For the convenience of description, the values of the left-eye and right-eye images in the entire brightness range are simplified as the average brightness of the left-eye and right-eye images 0.5*(L+R). At this point, the value selected for Tol1 is monotonically decreasing with the average brightness of the left-eye and right-eye images 0.5*(L+R).

Similarly, because the right eye experiences dark crosstalk and the crosstalk extent at P1 is smaller than P2, the tolerance coefficient Tol2 for the right eye should have a lower value at P1 than P2 as a reward for the bright surrounding at P1. At this point, the value selected for Tol2 is monotonically increasing with the average brightness of the left-eye and right-eye images 0.5*(L+R).

(3) Changes in Experience when Sum of Display Values is the Same

For another rule, the brightness of the left-eye and right-eye images and (L+R) are fixed and S1=S2 is used as example. Assume that the specific brightness at P1 is L1=40, R1=60, and the specific brightness at P2 is L2=10, R2=90. At this situation, R1+L1=R2+L2=100, that is, the sum of the display values of the pair of images with parallax at P1 is equal to the sum of the display values of the pair of images with parallax at P2. Because L1+R1=L2+R2, the actual display values at P1 and P2 are P1=P2=50 based on the area ratio.

Based on the actual experience, the left eye still experiences bright crosstalk and the crosstalk extent at P1 is less than P2; and the right eye still experiences dark crosstalk and the crosstalk extent at P1 is higher than P2. Therefore, the value selected for Tol1 is monotonically increasing with respect to the brightness difference R−L of the left-eye and right-eye images, and the value selected for Tol2 is monotonically decreasing with respect to the brightness difference R−L of the left-eye and right-eye images.

2. Examples for Quantization of Tol1 and Tol2

Based on the above description of human eye experience rules, when L≤R, the values selected for Tol1 and Tol2 can be based on the monotonic dynamics of the human eye experiencing bright crosstalk and dark crosstalk in an environment of different brightness. Specifically, (it should be understood that other means, such as square or functions can also be used to express the monotone):

$$\begin{cases} Tol1 = atol + btol * \dfrac{R-L}{L+R+\varepsilon} \\ Tol2 = atol - btol * \dfrac{R-L}{L+R+\varepsilon} \end{cases}$$

Wherein atol>0, btol>0 are adjustment coefficients, $\varepsilon$ is a very small positive value for avoiding the denominator becoming 0. Because Tol1 and Tol2 are the crosstalk tolerance ratio (i.e., relative value) for left eye and right eye, and mutually restraining to each other, the following can be imposed: Tol1+Tol2=1, Tol1≥0, Tol2≥0, and the above equation can be expressed as:

$$\begin{cases} Tol1 = 0.5 + 0.5 * \dfrac{R-L}{L+R+\varepsilon} \\ Tol2 = 0.5 - 0.5 * \dfrac{R-L}{L+R+\varepsilon} \end{cases}$$

3. Combination of Crosstalk Tolerance Coefficients and Display Area Ratio

Obviously, the crosstalk tolerance coefficients can be directly used as weight parameters $\alpha$ and $\beta$. Considering the relevance of the crosstalk tolerance coefficients and display area ratio, Tol1, Tol2 for human eye experience can be combined with the display area ratio S1, S2 to solve the parameters $\alpha$ and $\beta$.

In other words, if the 3D display device to which the display unit belongs is disposed with a spectroscopic device (as the spectroscopic device 100 in FIG. 2), the display area ratios (such as, S1, S2) on the display unit corresponding to the at least one pair of images with parallax can be used to adjust the corresponding parameters $\alpha$ and $\beta$.

A plurality of specific approaches can be used to find solution, such as, by adding or multiplying both. Take multiplication as example, the following is obtained:

$$\begin{cases} \alpha = Tol1 * S1 \\ \beta = Tol2 * S2 \end{cases}$$

By performing normalization computation on $\alpha$ and $\beta$, the result is as follows:

$$\begin{cases} \alpha = \alpha(Tol1, S1) = \dfrac{Tol1 * S1}{Tol1 * S1 + Tol2 * S2 + \varepsilon} \\ \beta = \beta(Tol2, S2) = \dfrac{Tol2 * S2}{Tol1 * S1 + Tol2 * S2 + \varepsilon} \end{cases}$$

4. Find Optimized Display Value
(1) n=1

At this point, equation (2) can be expressed as:

$$A = \alpha|P-L| + \beta|P-R| \geq 0 \quad (3)$$

Similar to the embodiment using only area ratio in computation, when A is minimized, i.e., A=0 and $\beta-\beta\neq 0$, the following is known:

$$P = \dfrac{\alpha L - \beta R}{\alpha - \beta} = \tilde{P}$$

When L≤R, the conclusion is:

$$P = \max\{L, \min[R, \tilde{P}]\}$$

When L>R, the conclusion is:

$$P = \max\{R, \min[L, \tilde{P}]\}$$

When $\alpha-\beta=0$, i.e., the weights for left-eye crosstalk total amount and the right-eye crosstalk total amount are the same, P=0.5*(L+R), or using other means to ensure that $\alpha-\beta$ can approaches 0 infinitely during the computation, but not becoming 0.

(2) n≠1

At this point, n>0 and n≠1, n is a positive real number. The values selected for A in equation (3) is a smooth curve function with respect to P, and based on the actual reasonable physic meaning, a minimum exists for A(P) in real number domain (P>0), and only extreme value (the remaining extremes are complex and without physical meaning). The following discusses finding solution.

1) L≤R

Based on actual physic meaning, P∈[L, R], and equation (3) can be expressed as:

$$A = \alpha(P-L)^n + \beta(R-P)^n \geq 0 \quad (4)$$

Find the derivation of A with respect to P, and find the zero point of the derivation, the following is obtained:

$$\dfrac{dA}{dP} \alpha n(P-L)^{n-1} - \beta n(R-P)^{n-1} = 0$$

In real number domain, equation (4) has on only solution and the solution is:

$$P = \dfrac{\alpha^{n-1} * L + \beta^{n-1} * R}{\alpha^{n-1} + \beta^{n-1}} = \tilde{P} \quad (5)$$

Because $\alpha+/\beta=1$, obviously:

$$L \leq \tilde{P} = \dfrac{\alpha^{n-1} * L + \beta^{n-1} * R}{\alpha^{n-1} + \beta^{n-1}} \leq R$$

2) L>R

The analysis process is similar to 1), and the value selected for the optimized P is consistent with the computation result of equation (5) in 1), and $\tilde{P}$ is between R and L.

In summary, the actual final value P selected for the sub-pixel can be calculated directly from equation (5) and the value is between L and L, wherein the specific computation involves root computation, the value with physic meaning is selected. For example, $\alpha^{n-1}$, when n=1.5, a positive real number solution is selected for the root operation of $\alpha$.

Based on the above description, when n has different value, the corresponding display value P can be calculated, such as:

When $n = 2$, $P = \dfrac{\alpha * L + \beta * R}{\alpha + \beta} = \alpha * L + \beta * R$;

When $n = 3$, $P = \dfrac{\alpha^2 * L + \beta^2 * R}{\alpha^2 + \beta^2}$;

When $n = 4$, $P = \dfrac{\alpha^3 * L + \beta^3 * R}{\alpha^3 + \beta^3}$;

When $n = 0.5$, $P = \dfrac{\alpha^{-0.5} * L + \beta^{-0.5} * R}{\alpha^{-0.5} + \beta^{-0.5}}$;

When $n = 1.5$, $P = \dfrac{\sqrt{\alpha} * L + \sqrt{\beta} * R}{\sqrt{\alpha} + \sqrt{\beta}}$;

When $n = 2.3$, $P = \dfrac{\alpha^{1.3} * L + \beta^{1.3} * R}{\alpha^{1.3} + \beta^{1.3}}$, and so on.

When designing different 3D display panel, n can be selected to ensure the optimized display result as the final parameter.

Embodiment 2

Vertical Slit Grating

The present embodiment uses a vertical slit grating as an example, and the projection period of the grating on the pixel panel is twice of the sub-pixel. At this point, if only the effect of human visual experience rule on the crosstalk is considered, the equation (1) can be transformed into:

$$A = \alpha|P-L|^n + \beta|P-R|^n \geq 0 \quad (6)$$

By using the approach of finding a solution as in Embodiment 1, the following is obtained:

$$\begin{cases} \alpha = Tol1 \\ \beta = Tol2 \end{cases}$$

At this point, the equation (6) can be specifically expressed as:

$$A = Tol1|P-L|^n + Tol2|P-R|^n \geq 0 \quad (7)$$

1. $n=1$ and $\alpha - \beta = 0$
From the above equation (7), the following is known:

$$P = \dfrac{Tol1 L - Tol2 R}{Tol1 - Tol2} = \check{P}$$

If $L \leq R$, then the calculated optimized display value is:

$P = \max\{L, \min[R, \check{P}]\}$

If $L > R$, then the calculated optimized display value is:

$P = \max\{R, \min[L, \check{P}]\}$

When $\alpha - \beta = 0$, i.e., the weight of the left-eye crosstalk value is the same as the weight of the right-eye crosstalk value, $P = 0.5*(L+R)$ can be selected, or other means can be used to ensure that $\alpha - \beta$ can approaches 0 infinitely during the computation, but not becoming 0.

2. $n \neq 1$
From equation (7), the following is known:

$$P = \dfrac{Tol1^{n-1} * L - Tol2^{n-1} * R}{Tol1^{n-1} - Tol2^{n-1}} = \check{P}$$

AT this point, the selected value for P should be between L and R. Also, for different 3D display screen design, n can be selected to ensure the optimized display result as the final parameter. Some of the common selections for n are: n=1.5, n=2, n=3, and so on.

Embodiment 3

Spectral Glasses-Based 3D Technology

The present embodiment uses spectral glasses-based 3D technology as example. The left lens and the right lens of the glasses can be designed to both have leakage rate as $\mu$ ($0 \leq \mu \leq 1$). Based on the definition of the information ratio parameters S1, S2 seen by the left and right eyes and not considering other leakage factors, any display unit in the left image display area of the display panel will have information ratios corresponding to the left and right eyes as $S1 = 1-\mu$, $S2 = \mu$, while any display unit in the right image display area of the display panel will have information ratios corresponding to the left and right eyes as $S1 = \mu$, $S2 = 1-\mu$. At this point, if only the effect of human eye visual experience rule on the crosstalk is considered, the following is obtained:

$$A = \alpha|P-L|^n + \beta|P-R|^n \geq 0 \quad (8)$$

By using the approach of finding a solution as in Embodiment 1, the following is obtained:

$$\begin{cases} \alpha = Tol1 * S1 \\ \beta = Tol2 * S2 \end{cases}$$

Because the same model is used, the conclusion from the embodiment 3 is the same as the conclusion from the embodiment 1.

Embodiment 4

Time-Division Glasses-Based 3D Technology

The present embodiment uses time-division glasses-based 3D technology as example. In the instant technical solution, by increasing the refreshing rate of the screen, displaying left image information L as the first frame for any fixed display unit, and displaying right image information R as the second frame. Then, a pair of aperture glasses is used to split light to realize 3D displaying.

Similar to Embodiment 3, the model is constructed considering the information ratio parameters S1, S2 seen by the left and right eyes and the human eye tolerance Tol1, Tol2 of visual experience rule. Assume that P1, P2 are the refreshing display values of two consecutive frames generated by the display unit after the crosstalk algorithm. The object of the present invention is to obtain reasonable P1, P2 so that the human eye experience minimum crosstalk when using time-division glasses-based 3D technology.

By using the similar approach of model construction and solution finding, an equivalent de-crosstalk P is obtained. P can be considered as the equivalent effectiveness value of P1, P2, and is expressed as:

$$2*P = P1 + P2 \quad (9)$$

As a matter of fact, in time-division glasses-based 3D technology, the first frame displayed is the left image and the second frame displayed is the right image. To ensure the de-crosstalk algorithm will not damage 3D parallax information, a lossless condition can be set as:

$$P1 - P2 = L - R \quad (10)$$

Combining equation (9) and equation (10), the refreshing display values of the two consecutive frames are:

$$\begin{cases} P1 = \max\left\{0, \min\left[255, \frac{2P+L-R}{2}\right]\right\} \\ P2 = \max\left\{0, \min\left[255, \frac{2P-L+R}{2}\right]\right\} \end{cases}$$

Embodiment 5

Parallax Information

The present embodiment considers the parallax information and combines with the optimization algorithm of the present invention to eliminate or relieve the crosstalk. The parallax refers to the visual difference caused by the direction when observing the same target from two points with a certain distance. Because there is a gap between the left and right eyes, a slight difference exists between the viewing angles for the left and right eyes. As such, a small displacement exists between the object viewed by the two eyes. The reason for human eyes to experience 3D visual effect is based on the parallax displacement so that the brain can organically synthesize the 3D image.

Based on the above theory, assume that a pixel location of any point G in the left image is $G_L$, and pixel location of any point G in the right image is $G_R$. Without considering the vertical parallax, the left image $G_L$ has a parallax as $G_L - G_R$, and the right image $G_R$ has a parallax as $G_R - G_L$ (the parallax comprises positive/negative sign or direction information.)

When $|G_L - G_R| = 0$, point G does not have parallax, i.e., the pixel coordinates of $G_L$ and $G_R$ are consistent. Without considering color shift, the projected color of the left and right images at the point G is consistent. When the $G_L$ and $G_R$ performs scanning or de-crosstalk according to the above tol1, tol2 or S1, S2, no de-crosstalk is necessary because the color is consistent.

When $|G_L - G_R|$ has a relatively large value, and the pixel coordinate of $G_L$ of the left image is mapped to left image, the corresponding point and the $G_L$ of the left image correspond to two different points in the space, and the larger the $|G_L - G_R|$ is, the distance between the two points will be. As such, the possibility of color difference or brightness difference existing at the point is higher (the actual difference is related to the actual display content), and the possibility of crosstalk existing is higher. Therefore, at this point, the corresponding weight should be more punished to reduce the crosstalk.

In summary, when neglecting the effect from the 3D specific display content, the crosstalk shows monotonic relation with respect to parallax. That is, the larger the parallax is, the larger the crosstalk amount will be; and vice versa. Therefore, based on the monotonic relation, an approach similar to the Embodiment 1 can be used to construct model for weights α, β. Then, based on the above approach to find solution to realize the reduction or elimination of crosstalk algorithm.

In addition, because the parallax has positive/negative sign and direction information, the information can be used to realize directional de-crosstalk algorithm. Specifically, when viewing a 3D scene, the scene is protruding scene towards the viewer (assume that when the left parallax is positive, the generated 3D effect is protruding.) If the left and right sides of the protruding scene experience crosstalk, the crosstalk on the protruding part in the edge area on the left side is mainly generated by the left image being as a background, and the crosstalk on the protruding part in the edge area on the right side is mainly generated by the right image being as a background. Similarly, when the 3D scene is a concave scene (the left parallax is negative), the reverse conclusion is made for the generated crosstalk, i.e., the crosstalk on the protruding part in the edge area on the left side is mainly generated by the right image being as a background, and the crosstalk on the protruding part in the edge area on the right side is mainly generated by the left image being as a background. Therefore, the parallax directional information can be used to construct corresponding directional model for the crosstalk effect rule to realize de-crosstalk.

Accordingly, the present invention also provides a corresponding technical solution of functional modules. Specifically, FIG. 4 is a schematic view of the 3D display device according to an embodiment of the present invention.

Figure 4:
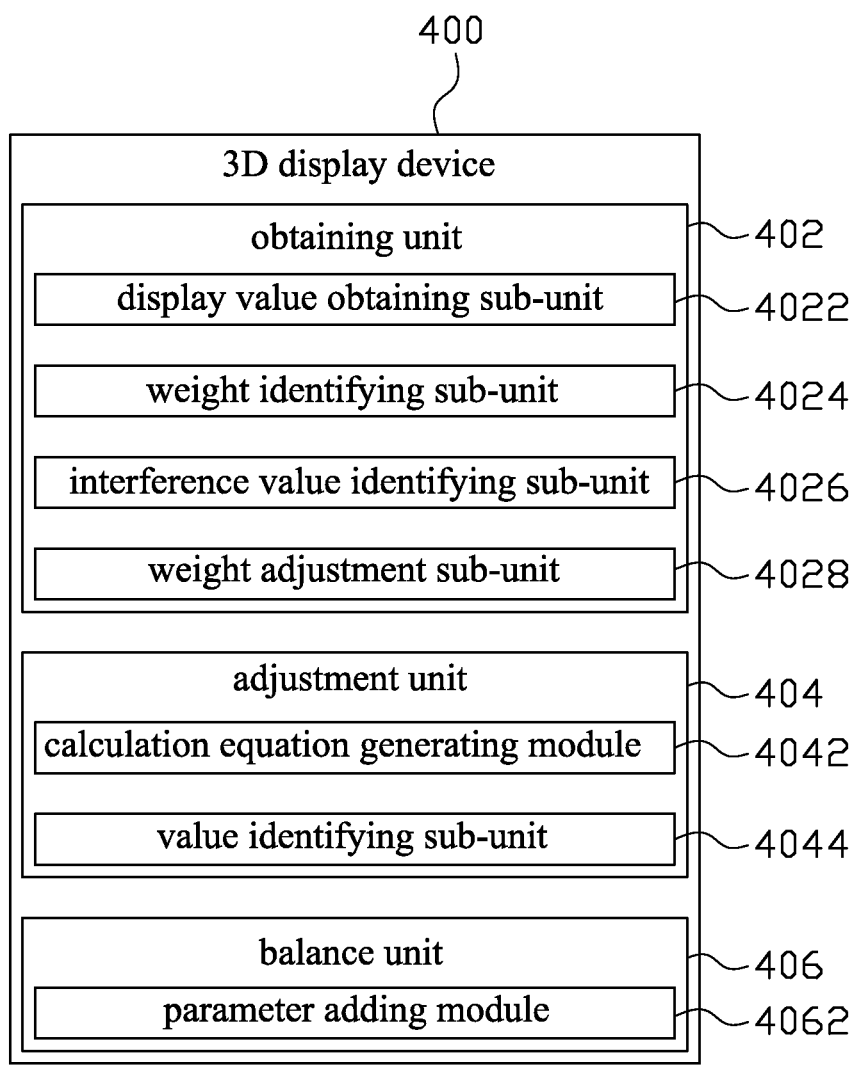
FIG. 4 is a schematic view of the 3D display device according to an embodiment of the present invention.

As shown in FIG. 4, another embodiment of the present invention provides a 3D display device 400, which comprises: an obtaining unit 402, for obtaining at least one pair of an interference value of a display unit displaying at least one pair of images with parallax; and an adjustment unit 404, for adjusting the display unit based on the interference value; and the adjusted display unit displaying the at least one pair of images with parallax.

In the instant technical solution, when displaying at least one pair of images with parallax in a 3D manner, the crosstalk resulted from different display values can be reduced by adjusting the interference value so that the optimized display values for the display unit can be obtained so as to overcome the poor displaying result caused by the crosstalk and improve the overall 3D viewing experience.

In addition, according to a preferred embodiment of the present invention, the 3D display device 400 further comprises the following technical feature:

According to a preferred embodiment of the present invention, the obtaining unit 402 further comprises: a display value obtaining sub-unit 4022, for obtaining display values of locations corresponding to the at least one pair of images with parallax; a weight identifying sub-unit 4024, for based on correspondence between the display values and pre-stored display values and weights, identifying respective weights corresponding to the at least one pair of images with parallax; and an interference value identifying sub-unit 4026, for based on the respective weights corresponding to the at least one pair of images with parallax, and the difference between the optimized display values and the display values of the location corresponding to the at least one pair of images with parallax respectively, identifying the interference value.

In the instant technical solution, certain rules exist in the extent of crosstalk experienced by human eyes when the crosstalk is caused by different display values. By storing the rules in the 3D display device, the display values of the locations corresponding to the at least one pair of images with parallax can be based to identify the weights corresponding to the images so as to adjust the display values of the display unit according to the control of interference value to relieve crosstalk.

Because the crosstalk is mutually generated between at least one pair of images with parallax, the obtaining of display values of locations corresponding to at least one pair of images with parallax enables the understanding of the affected extent on the left-eye image and right-eye image. When the adjustment to the optimized display values is based on the crosstalk effect, the left-eye image and the right-eye image can both be considered when adjusted to avoid adjusting the left-eye image and right-eye image inconsistently, which may result in an inconsistent viewing for both eyes.

Specifically, the correspondence between the display values and weights can be stored in various forms, such as, tables, curves, and so on. The display values can be used to identify the corresponding weights to calculate the final optimized display values.

According to a preferred embodiment of the present invention, the obtaining unit 402 further comprises: a weight adjustment sub-unit 4028, if a spectroscopic device is disposed in the 3D display device 400 to which the display unit belongs, for based on the display area ratio corresponding to the at least one pair of images with parallax on the display unit, adjusting weights corresponding to the at least one pair of images with parallax.

In the instant technical solution, since the display area ratio is related to the affected extent, such as, a higher affected extent for a larger display area ratio, therefore, by considering both the display area ratio and the human eye experience rule, the adjustment to the optimized display values can be more précised realized. In other words, the interference value on the left-eye image and the right-eye image is reduced to decrease the crosstalk effect.

According to a preferred embodiment of the present invention, the adjustment unit 404 further comprises: a calculation equation generating sub-unit 4042, for based on the weights respectively corresponding to the at least one pair of images with parallax and the display values of locations corresponding to the at least one pair of images with parallax, generating a calculation equation for the interference value with respect to the optimized display values; a value identifying sub-unit 4044, when the calculation equation has a minimum interference value and the optimized display value of the display unit is between the display value of the left-eye image and the display value of the right-eye image, the optimized display value of the display unit being obtained; wherein the weights respectively corresponding to the at least one pair of images with parallax are: for at least one pair of images with parallax, a first weight of a first crosstalk amount in the left-eye image caused by the right-eye image on the left-eye image, and a second weight of a second crosstalk amount in the right-eye image caused by the left-eye image on the right-eye image.

In the instant technical solution, through finding the weights corresponding to the display values and generating the calculation equation for the interference value accordingly, the affected extent on the left-eye image and the right-eye image is embodied. Therefore, when the optimized display value is calculated based on the equation, the adjustment on the crosstalk amount on the left-eye image and the right-eye image can be reflected, i.e., reducing crosstalk effect.

According to a preferred embodiment of the present invention, the device further comprises: a balancing unit 406, for based on the difference between the first crosstalk amount and the second crosstalk amount, adjusting the calculational equation of the interference value to balance the first crosstalk amount and the second crosstalk amount; and based on the adjusted calculation equation of the interference value, the value identifying sub-unit 4044 obtaining the optimized display value of the display unit.

In the instant technical solution, not only the interference value must be minimized, the difference between the first crosstalk amount and the second crosstalk amount is also considered through the adjustment on the calculation equation of the interference value so that the respective crosstalk amount corresponding to the left-eye image and the right-eye image is more balanced and reasonable when the left-eye image and the right-eye image are displayed with the adjusted display values, which makes the left-eye image and the right-eye image more coordinated to improve viewing experience.

Preferably, the balancing unit 406 further comprises: a parameter adding sub-unit 4062, for adding a balance control parameter for the difference between the first crosstalk amount and the second crosstalk amount to the calculation equation of the interference value.

In the instant technical solution, through adding the balance control parameter, the consideration of the difference between the first crosstalk amount and the second crosstalk amount is taken into account so as to balance the respective crosstalk amount corresponding to the left-eye image and right-eye image, which makes the left-eye image and the right-eye image more coordinated to improve viewing experience.

According to a preferred embodiment of the present invention, the correspondence comprises: for at least one pair of images with parallax, when the display value of an image is larger than the display value of the other image, the weight corresponding to the image is larger than the weight corresponding to the other image.

According to a preferred embodiment of the present invention, the correspondence comprises: when the difference between the display values for at least one pair of images with parallax is the same, if the display value of an image is larger than the display value of the other image, the weight corresponding to the image is positively proportional to the display value of the image; and the weight corresponding to the other image is negatively proportional to the display value of the other image.

According to a preferred embodiment of the present invention, the correspondence comprises: when the sum of the display values for at least one pair of images with parallax is the same, if the display value of an image is larger than the display value of the other image, the weight corresponding to the image is negatively proportional to the display value of the image; and the weight corresponding to the other image is positively proportional to the display value of the other image.

The above refers drawings and embodiments to describe the technical solution of the present invention. The crosstalk can severely affect the viewing experience. Therefore, the present invention provides a 3D display method and a 3D display device to effectively relieve the crosstalk phenomenon in 3D displaying process to optimize the 3D display result.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A three-dimensional (3D) display method, which comprises:
    obtaining an interference value of a display unit displaying at least one pair of images with parallax;
    adjusting the display unit based on the interference value; and
    the adjusted display unit displaying the at least one pair of images with parallax.

2. The 3D display method as claimed in claim 1, wherein the step of obtaining the interference value comprises:
    obtaining display values of locations corresponding to the at least one pair of images with parallax;
    based on correspondence between the display values and pre-stored display values and weights, identifying respective weights corresponding to the at least one pair of images with parallax; and
    based on the respective weights corresponding to the at least one pair of images with parallax, and the difference between an optimized display value and the display values of the locations corresponding to the at least one pair of images with parallax respectively, identifying the interference value.

3. The 3D display method as claimed in claim 2, wherein the step of obtaining the interference value comprises:
    if a spectroscopic device is disposed in the 3D display device to which the display unit belongs, based on the respective display area ratio corresponding to the at least one pair of images with parallax on the display unit, adjusting weights corresponding to the at least one pair of images with parallax.

4. The 3D display method as claimed in claim 2, wherein the step of adjusting the display unit based on the interference value comprises:
    based on the weights respectively corresponding to the at least one pair of images with parallax and the display values of locations corresponding to the at least one pair of images, generating a calculation equation for the interference value with respect to the optimized display values;
    when the calculation equation has a minimum, and the optimized display value of the display unit is between the display value of the left-eye image and the display value of the right-eye image, the optimized display value of the display unit being obtained;
    wherein the weights respectively corresponding to the at least one pair of images with parallax are: for the at least one pair of images with parallax, a first weight of a first crosstalk amount caused by the right-eye image on the left-eye image, and a second weight of a second crosstalk amount caused by the left-eye image on the right-eye image.

5. The 3D display method as claimed in claim 4, wherein the method further comprises:
    based on the difference between the first crosstalk amount and the second crosstalk amount, adjusting the calculation equation of the interference value to balance the first crosstalk amount and the second crosstalk amount; and
    based on the adjusted calculation equation of the interference value, obtaining the optimized display value of the display unit.

6. The 3D display method as claimed in claim 5, wherein the step of adjusting interference value comprises:
    adding a balance control parameter for the difference between the first crosstalk amount and the second crosstalk amount to the calculation equation of the interference value.

7. The 3D display method as claimed in claim 2, wherein the correspondence comprises:
    for the at least one pair of images with parallax, when the display value of an image is larger than the display value of the other image, the weight corresponding to the image is larger than the weight corresponding to the other image.

8. The 3D display method as claimed in claim 2, wherein the correspondence comprises:
    when the difference between the display values of the at least one pair of images with parallax is the same, if the display value of an image is larger than the display value of the other image, the weight corresponding to the image is positively proportional to the display value of the image; and the weight corresponding to the other image is negatively proportional to the display value of the other image.

9. The 3D display method as claimed in claim 2, wherein the correspondence comprises:
    when the sum of the display values of at least one pair of images with parallax is the same, if the display value of an image is larger than the display value of the other image, the weight corresponding to the image is negatively proportional to the display value of the image; and the weight corresponding to the other image is positively proportional to the display value of the other image.

10. A three-dimensional (3D) display device, which comprises:
    an obtaining unit, for obtaining an interference value of a display unit displaying at least one pair of images with parallax; and
    an adjustment unit, for adjusting the display unit based on the interference value; and the adjusted display unit displaying the at least one pair of images with parallax.

11. The 3D display device as claimed in claim 10, wherein the obtaining unit further comprises:
    a display value obtaining sub-unit, for obtaining display values of locations corresponding to the at least one pair of images with parallax;
    a weight identifying sub-unit, for based on correspondence between the display values and pre-stored display values and weights, identifying respective weights corresponding to the at least one pair of images with parallax; and
    an interference value identifying sub-unit, for based on the respective weights corresponding to the at least one pair of images with parallax, and the difference between the optimized display values and the display values of the location corresponding to the at least one pair of images with parallax respectively, identifying the interference value.

12. The 3D display device as claimed in claim 11, wherein the obtaining unit further comprises:
    a weight adjustment sub-unit, if a spectroscopic device is disposed in the 3D display device to which the display unit belongs, for based on the display area ratio corresponding to the at least one pair of images with parallax on the display unit, adjusting weights corresponding to the at least one pair of images with parallax.

13. The 3D display device as claimed in claim 11, wherein the adjustment unit further comprises:

a calculation equation generating sub-unit, for based on the weights respectively corresponding to the at least one pair of images with parallax and the display values of locations corresponding to the at least one pair of images with parallax, generating a calculation equation for the interference value with respect to the optimized display values;

a value identifying sub-unit, when the calculation equation has a minimum interference value and the optimized display value of the display unit is between the display value of the left-eye image and the display value of the right-eye image, the optimized display value of the display unit being obtained;

wherein the weights respectively corresponding to the at least one pair of images with parallax are: for at least one pair of images with parallax, a first weight of a first crosstalk amount in the left-eye image caused by the right-eye image on the left-eye image, and a second weight of a second crosstalk amount in the right-eye image caused by the left-eye image on the right-eye image.

14. The 3D display device as claimed in claim 13, wherein the device further comprises:

a balancing unit, for based on the difference between the first crosstalk amount and the second crosstalk amount, adjusting the calculational equation of the interference value to balance the first crosstalk amount and the second crosstalk amount; and based on the adjusted calculation equation of the interference value, the value identifying sub-unit obtaining the optimized display value of the display unit.

15. The 3D display device as claimed in claim 14, wherein the balancing unit further comprises:

a parameter adding sub-unit, for adding a balance control parameter for the difference between the first crosstalk amount and the second crosstalk amount to the calculation equation of the interference value.

16. The 3D display device as claimed in claim 11, wherein the correspondence comprises:

for at least one pair of images with parallax, when the display value of an image is larger than the display value of the other image, the weight corresponding to the image is larger than the weight corresponding to the other image.

17. The 3D display device as claimed in claim 11, wherein the correspondence comprises:

when the difference between the display values of the at least one pair of images with parallax is the same, if the display value of an image is larger than the display value of the other image, the weight corresponding to the image is positively proportional to the display value of the image; and the weight corresponding to the other image is negatively proportional to the display value of the other image.

18. The 3D display device as claimed in claim 11, wherein the correspondence comprises:

when the sum of the display values of the at least one pair of images with parallax is the same, if the display value of an image is larger than the display value of the other image, the weight corresponding to the image is negatively proportional to the display value of the image; and the weight corresponding to the other image is positively proportional to the display value of the other image.

19. A three-dimensional (3D) display method, which comprises:

obtaining an interference value of a display unit displaying at least one pair of images with parallax;

adjusting the display unit based on the interference value; and the adjusted display unit displaying the at least one pair of images with parallax;

wherein the step of obtaining the interference value comprises:

obtaining display values of locations corresponding to the at least one pair of images with parallax;

based on correspondence between the display values and pre-stored display values and weights, identifying respective weights corresponding to the at least one pair of images with parallax.

20. The 3D display method as claimed in claim 19, wherein the step of obtaining the interference value further comprises:

based on the respective weights corresponding to the at least one pair of images with parallax, and the difference between the optimized display values and the display values of the location corresponding to the at least one pair of images with parallax respectively, identifying the interference value.

* * * * *